United States Patent
Ryan (10) Patent No.: US 8,953,274 B1
(45) Date of Patent: Feb. 10, 2015

(54) DECELERATION OF SPINDLE MOTOR IN DISK DRIVE

(71) Applicant: Western Digital Technologies, Inc., Irvine, CA (US)

(72) Inventor: Robert P. Ryan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/960,738

(22) Filed: Aug. 6, 2013

Related U.S. Application Data (60) Provisional application No. 61/831,966, filed on Jun. 6, 2013.

(51) Int. Cl.
G11B 19/02 (2006.01)
G11B 21/02 (2006.01)
G11B 19/26 (2006.01)

(52) U.S. Cl.
CPC ............................... *G11B 19/26* (2013.01)
USPC .............................................. 360/69; 360/75

(58) Field of Classification Search
None
See application file for complete search history.

(56) References Cited

U.S. PATENT DOCUMENTS

| | | |
|---|---|---|
| 5,546,806 A | 8/1996 | Kain |
| 6,104,153 A | 8/2000 | Codilian et al. |
| 6,476,996 B1 * | 11/2002 | Ryan ................................ 360/75 |
| 6,549,359 B1 | 4/2003 | Bennett et al. |
| 6,768,066 B2 | 7/2004 | Wehrenberg |
| 7,059,182 B1 | 6/2006 | Ragner |
| 7,071,597 B2 | 7/2006 | Lee et al. |
| 7,161,758 B2 | 1/2007 | Adapathya et al. |
| 7,191,089 B2 | 3/2007 | Clifford et al. |
| 7,281,522 B1 | 10/2007 | Sato et al. |
| 7,307,228 B2 | 12/2007 | Wehrenberg |
| 7,369,345 B1 | 5/2008 | Li et al. |
| 7,382,576 B2 | 6/2008 | Okada et al. |
| 7,397,626 B2 | 7/2008 | Aoki et al. |
| 7,477,469 B2 | 1/2009 | Cook et al. |
| 7,499,232 B2 | 3/2009 | Hodge et al. |
| 7,525,750 B2 | 4/2009 | Aoki et al. |
| 7,525,751 B2 | 4/2009 | Han et al. |
| 7,541,551 B2 | 6/2009 | Wehrenberg |
| 7,663,833 B2 | 2/2010 | Aoki et al. |
| 7,667,743 B2 | 2/2010 | Uchida et al. |
| 7,690,253 B2 | 4/2010 | Noda et al. |
| 7,706,097 B2 | 4/2010 | Kuroki et al. |
| 7,747,818 B1 | 6/2010 | Overby |
| 7,751,142 B2 | 7/2010 | Karakas |
| 7,752,351 B1 | 7/2010 | Overby |
| 7,782,563 B2 | 8/2010 | Han et al. |
| 7,802,476 B2 | 9/2010 | Lasalandra et al. |
| 7,865,253 B2 | 1/2011 | Harrington |
| 8,245,573 B2 | 8/2012 | Lammel |
| 8,345,025 B2 | 1/2013 | Seibert et al. |
| 8,363,344 B2 | 1/2013 | Lin et al. |
| 8,408,041 B2 | 4/2013 | Ten Kate et al. |
| 2005/0213242 A1 | 9/2005 | Fujiki et al. |

(Continued)

*Primary Examiner* — K. Wong (57) ABSTRACT

A spindle motor of a disk drive includes a stator with windings and a rotor configured to rotate a disk of the disk drive. It is determined whether the disk drive is in a falling state while the disk rotates, and when the disk drive is in the falling state, a negative torque is applied to the rotor to reduce an angular velocity of the disk. When the angular velocity of the disk reaches a threshold angular velocity, an electrical short is caused across the windings of the stator to further reduce the angular velocity of the disk.

24 Claims, 7 Drawing Sheets

(56) References Cited

U.S. PATENT DOCUMENTS

| | | |
|---|---|---|
| 2006/0070439 A1 | 4/2006 | Kwon et al. |
| 2007/0223123 A1 | 9/2007 | Karakas |
| 2011/0215940 A1 | 9/2011 | Bartholomeyczik et al. |
| 2012/0324980 A1 | 12/2012 | Nguyen et al. |
| 2013/0054180 A1 | 2/2013 | Barfield |
| 2013/0107394 A1 | 5/2013 | Lin et al. |
| 2013/0120147 A1 | 5/2013 | Narasimhan et al. |

* cited by examiner

DECELERATION OF SPINDLE MOTOR IN DISK DRIVE

CROSS-REFERENCE TO RELATED APPLICATION

This application claims the benefit of U.S. Provisional Application No. 61/831,966, filed on Jun. 6, 2013, which is hereby incorporated by reference in its entirety.

BACKGROUND

Disk drives are often used in electronic devices to record data onto or to reproduce data from a recording media. The recording media can include one or more rotating magnetic disks. As electronic devices become increasingly mobile, the risk of mechanical shock to a disk drive and its disks increases from events such as when the electronic device is dropped.

During mechanical shock events, a disk inside the disk drive can deflect and possibly come in contact with other components within the disk drive. This contact can create particulate matter which can affect future operation and reliability of the disk drive.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
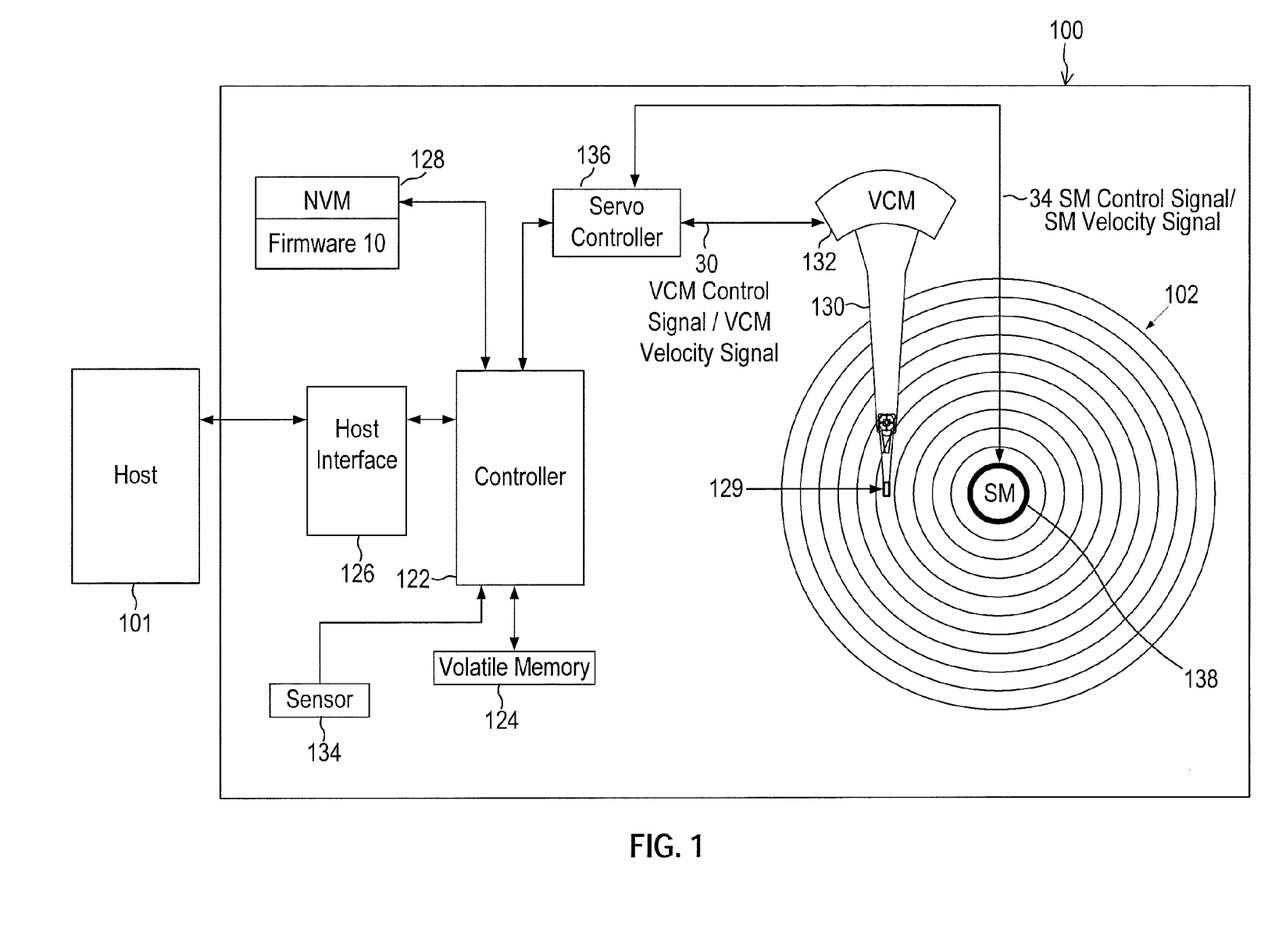
FIG. 1 is a block diagram depicting a disk drive according to an embodiment.

FIG. 1 illustrates a block diagram of disk drive 100 according to one example embodiment. Those of ordinary skill in the art will appreciate that disk drive 100 can include more or less than those elements shown in FIG. 1.

As shown in FIG. 1, disk drive 100 includes controller 122 which can perform various operations of disk drive 100 described herein. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

In the example of FIG. 1, disk drive 100 includes rotating magnetic disk 102 and head 129 connected to the distal end of actuator 130 which is rotated by voice coil motor (VCM) 132 to position head 129 over disk 102. Head 129 includes at least a read element (not shown) for reading data from disk 102, and a write element (not shown) for writing data on disk 102.

Figure 2:
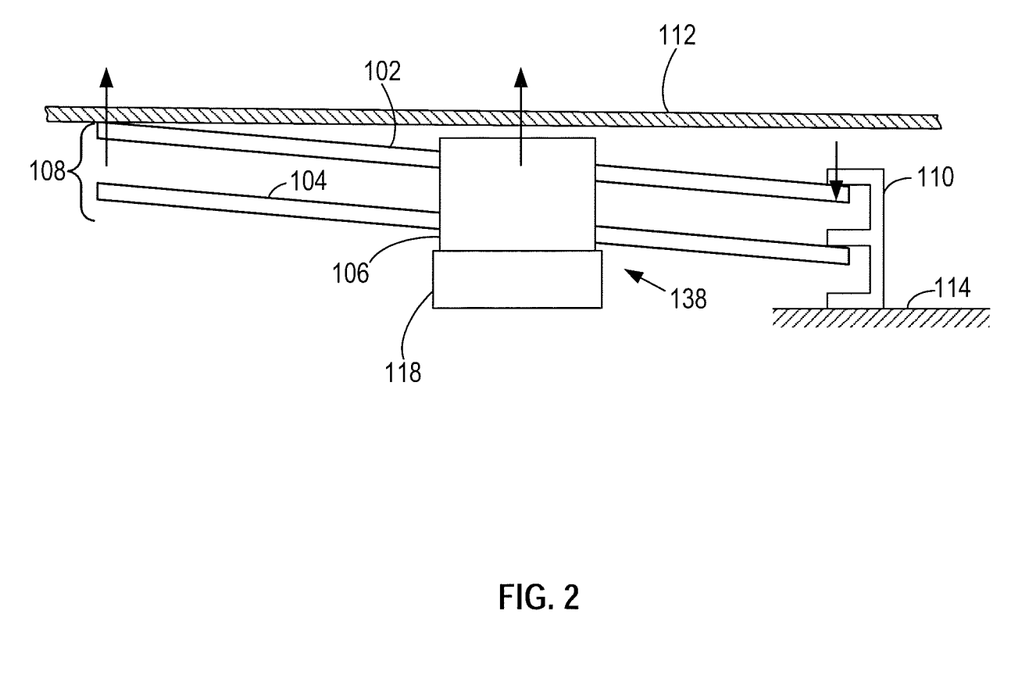
FIG. 2 illustrates a disk pack of the disk drive of FIG. 1 during an example of a mechanical shock event.

Disk 102 comprises a number of radial spaced, concentric tracks for storing data and is part of a disk pack which includes disk 104 below disk 102 as shown in FIG. 2. In this regard, additional heads (not shown) can be mounted in a head stack assembly on the distal end of actuator 130 for reading data from and writing data on a bottom surface of disk 102 and surfaces of disk 104.

With reference to FIG. 1, disk drive 100 also includes solid-state non-volatile memory (NVM) 128 which includes a computer-readable medium for storing data, for example, for use as a cache or as part of a solid state hybrid drive (SSHD) implementation of disk drive 100. NVM 128 stores disk drive firmware 10 which can include computer-readable instructions used by disk drive 100 to implement the spindle motor control processes described below.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Volatile memory 124 can include, for example, a DRAM. Data stored in volatile memory 124 can include data read from disks 102 or 104, data to be written to disks 102 or 104, and/or instructions for disk drive 100, such as instructions loaded into volatile memory 124 from disk drive firmware 10.

Host interface 126 is configured to interface disk drive 100 with host 101 which is in communication with disk drive 100. Host interface 126 may interface with host 101 according to a standard such as, for example, PCI express (PCIe), serial advanced technology attachment (SATA), or serial attached SCSI (SAS). As will be appreciated by those of ordinary skill in the art, host interface 126 can be included as part of controller 122. Although FIG. 1 depicts the co-location of host 101 and disk drive 100, in some embodiments the two need not be physically co-located. In some embodiments, disk drive 100 may be located remotely from host 101 and connected to host 101 via a network interface.

Disk drive 100 also includes spindle motor (SM) 138 for rotating disks 102 and 104 during read/write operations. SM 138 and VCM 132 are connected to servo controller 136 which includes circuitry for converting control signals received from controller 122 into VCM control signal 30 and SM control signal 34. These control signals can be, for example, control currents for controlling the rotation of VCM 132 and SM 138.

In addition, servo controller 136 is configured to receive SM velocity signal 34 from SM 138 which can be processed by controller 122 for detecting an angular velocity of SM 138. As discussed below with reference to FIG. 6, SM velocity signal 34 can be the result of a sensed back EMF generated by a rotor (i.e., rotor 106 in FIG. 2) of SM 138 and/or a sensed mutual inductance of windings in a stator (i.e., stator 118 in FIG. 2) of SM 138. Servo controller 136 is also configured to receive VCM velocity signal 30 which can be processed by controller 122 for detecting an angular velocity of VCM 132.

Sensor 134 is configured for sensing acceleration of disk drive 100 and can include, for example, an XYZ-YPR sensor with six degrees of freedom or at least one of an XYZ sensor and/or a YPR sensor. The acceleration sensed by sensor 134 can be used by controller 122 to predict an impending mechanical shock event. For example, sensor 134 may detect that disk drive 100 is in a falling state such as a free-fall state or a tipping-drop state where disk drive 100 rotates about an axis while at least a portion of disk drive 100 drops. Controller 122 may then implement a spindle motor deceleration process to quickly reduce an angular velocity of disks 102 and 104 before impact.

In other embodiments, sensor 134 may be located in host 101. In such embodiments, host 101 and disk drive 100 may be part of an electronic device such as a computer system (e.g., desktop, mobile/laptop, tablet, smartphone, etc.). Host 101 can then send a falling signal to disk drive 100 to indicate that host 101 and disk drive 100 are in a falling state.

In yet other embodiments, sensor 134 is configured to sense the acceleration of disk drive 100 by monitoring a deceleration profile of SM 138 that indicates that SM 138 is slowing down in a particular way which corresponds to a falling state. In such embodiments, sensor 134 may be included as part of controller 122.

As noted above, a disk can deflect and possibly contact other components within the disk drive during a mechanical shock event. This contact can create particulate matter which can affect the operation and reliability of the disk drive. If the disk is rotating, the potential to create particulate matter increases. More specifically, particulate matter generation is roughly proportional to the amount of work applied at the contact interface, and to a first order approximation, the applied work is proportional to the angular velocity of the disk at the time of contact. The generated amount of particulate matter can therefore be decreased by reducing the angular velocity of the disks before contact.

FIG. 2 illustrates contact of disks 102 and 104 with other components of disk drive 100 during a mechanical shock event such as an impact after disk drive 100 has been dropped. As shown in FIG. 2, disk pack 108 includes disks 102 and 104 mounted on rotor 106. As shown in FIG. 2, SM 138 includes rotor 106 and stator 118 which rotates rotor 106. In more detail, stator 118 rotates rotor 106 by applying a torque on rotor 106 through an electro-motive force (EMF) generated by a current applied to windings (not shown) of stator 118.

FIG. 2 also depicts ramp 110 which is affixed to base 114 and extends over a portion of disks 102 and 104 for separating or "unloading" head 129 from a surface of disk 102. At the beginning of a period of non-operation of disk drive 100, actuator 130 swings head 129 away from rotor 106 and beyond an outer peripheral extent of disks 102 and 104. A lift tab (not shown) near head 129 then contacts ramp 110 to unload head 129 from a surface of disk 102. After such unloading, ramp 110 supports head 129, rather than disk 102 providing such support.

In FIG. 2, disk pack 108 moves with an upward force as indicated by the upward arrow pointing from rotor 106 toward cover 112. In this example, the top surfaces of disks 102 and 104 first contact portions of ramp 110 which surround portions of the disks. The initial contact with ramp 110 causes the rocking shape illustrated by the arrows at cover 112 and ramp 110 in FIG. 2. The downward arrow at ramp 110 indicates a downward force applied to disks 102 and 104 by contact with ramp 110 and the upward arrow at cover 112 indicates an upward force applied to disk 102 by contact with cover 112.

Figure 3:
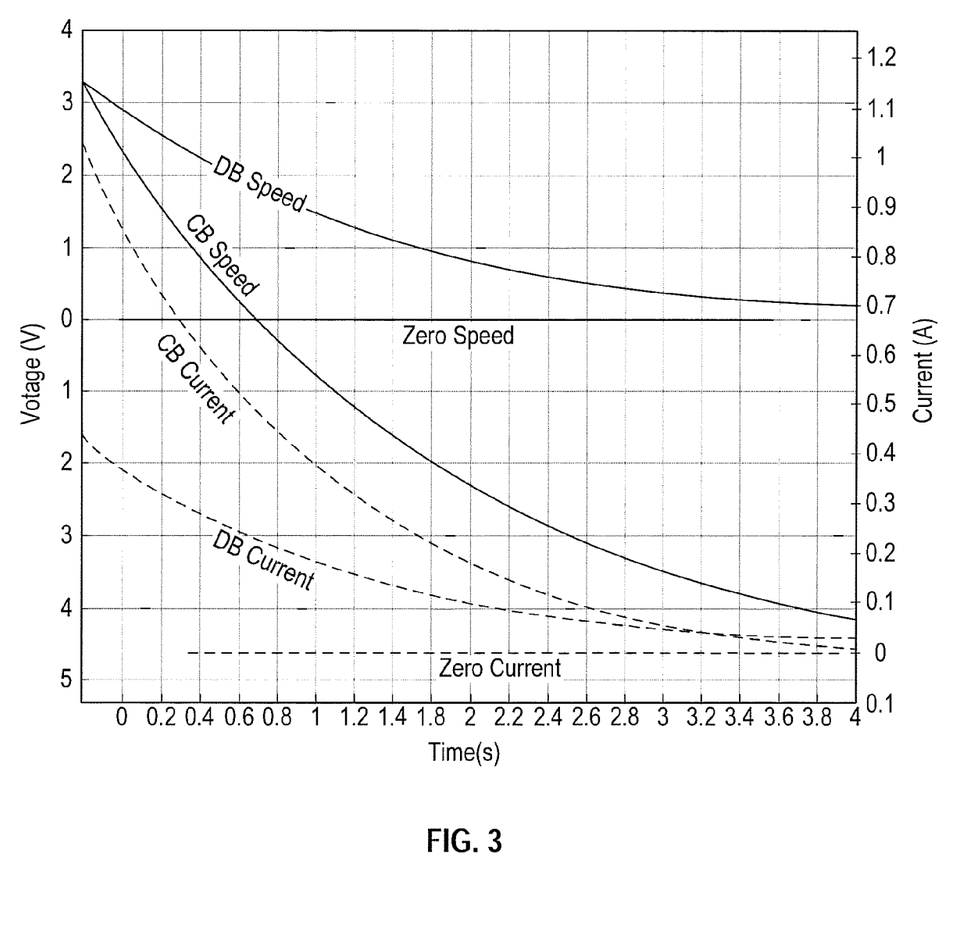
FIG. 3 is a graph of example speed and current curves for a spindle motor during controlled braking and dynamic braking.

In an effort to decrease particulate matter generation during such a mechanical shock event, rotation of disks 102 and 104 can be reduced before contact. FIG. 3 depicts example angular speed and current curves for SM 138 while reducing rotation of disks 102 and 104 during either a controlled braking operation (fast spin down) or a dynamic braking operation.

With dynamic braking, servo controller 136 electrically shorts the windings in stator 118 to develop a dynamic braking current which can be expressed as a back EMF divided by a winding resistance. The dynamic braking current forms a braking torque that resists the rotation of rotor 106 to reduce rotation of disks 102 and 104.

With controlled braking, servo controller 136 stages power supplied to SM 138 to develop a controlled braking current which forms a negative torque applied to rotor 106. Specifically, power is staged so that current in the windings of stator 118 drives rotor 106 in reverse in the direction of the back EMF to increase the braking torque. In this regard, the controlled braking current can be expressed by adding the back EMF to the voltage of the staged power and dividing the sum by the winding resistance.

A more detailed description of controlled braking and dynamic braking operations is provided in U.S. Pat. No. 6,104,153 by Codilian et al., issued on Aug. 15, 2000, the contents of which are hereby incorporated by reference.

As shown in FIG. 3, the controlled braking speed (CB speed) reaches the zero speed line well before the dynamic braking speed (DB speed) and therefore stops rotation of disks 102 and 104 quicker than using dynamic braking. In the example of FIG. 3, controlled braking stops rotation of disks 102 and 104 in approximately 0.7 seconds while dynamic braking takes over 4.0 seconds.

The CB speed in FIG. 3 also shows that after reaching the zero speed line, SM 138 begins to rotate in the opposite direction as the CB current decreases. The DB speed, on the other hand, asymptotically approaches the zero speed line as the DB current decreases toward the zero current line.

To reduce rotation of disks 102 and 104 before a mechanical shock event, controlled braking can quickly reduce rotation and then dynamic braking can further reduce rotation of disks 102 and 104 without causing rotation in an opposite direction. Since particulate matter generation is approximately proportional to the angular speed of a contacting disk, even reducing the angular speed from an operational speed such as 5,400 revolutions per minute (RPM) to a lower speed such as 1,000 RPM can reduce particulate matter generation upon contact with the disk. In other words, it is not necessary for the disk to come to a complete stop to realize the benefits of reducing the rotation of the disk before contact.

Figure 4:
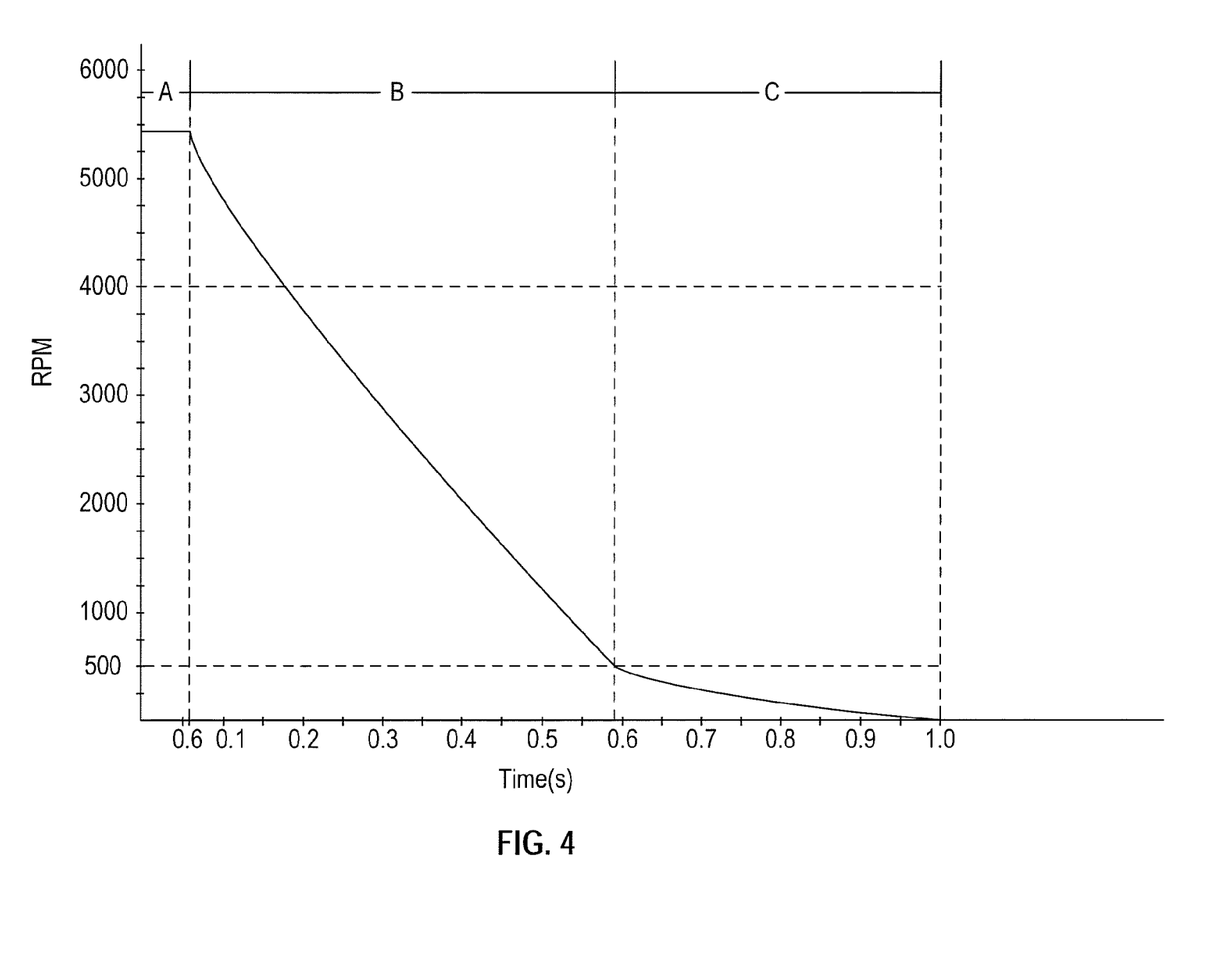
FIG. 4 is a graph depicting deceleration of a spindle motor according to an embodiment.

FIG. 4 is a graph depicting deceleration of SM 138 according to one embodiment. As will be appreciated by those of ordinary skill in the art, the specific angular velocities and times shown in FIG. 4 are merely an example implementation and do not limit the present disclosure.

In the example of FIG. 4, control of SM 138 is broken into three periods: A; B; and C. During period A from 0 to 0.6 seconds, rotor 106 of SM 138 is rotating at an operating speed of approximately 5,400 RPM. Period A begins with controller 122 determining that disk drive 100 is in a falling state while disks 102 and 104 rotate. This determination may be made based on an acceleration derived from input from sensor 134 being greater than a threshold acceleration. The threshold acceleration can correspond to an acceleration less than a free-fall acceleration for disk drive 100 but large enough to indicate that disk drive 100 has been dropped or is in a free-fall state. The threshold acceleration can also be equal to a free-fall acceleration.

In other implementations, controller 122 may determine that disk drive 100 is in a falling state based on an acceleration for disk drive 100 being outside of a predetermined range. In such implementations, controller 122 may determine that disk drive 100 is in a falling state after the acceleration has been outside of the predetermined range for more than a predetermined period of time.

In yet other implementations, controller 122 may determine that disk drive 100 is in a falling state based on a falling signal received from host 101 via host interface 126. In such implementations, sensor 134 may be located in host 101 as discussed above with reference to FIG. 1.

In another implementation, controller 122 may determine that disk drive 100 is in a falling state by monitoring a deceleration profile of SM 138 that indicates that SM 138 is slowing down in a particular way which corresponds to a falling state.

In FIG. 4, controller 122 initiates unloading of head 129 during period A by causing VCM 132 to move actuator 130 and head 129 toward an outer periphery of disk 102. Initiating unloading of head 129 may be performed to allow enough time for head 129 to unload onto ramp 110 before disk 102 slows down below a safe fly RPM. The safe fly RPM is an angular speed below which head 129 may contact the surface of disk 102 and is shown in FIG. 4 as the dashed line at 4,000 RPM. During normal operation, head 129 floats over the surface of disk 102 due to airflow between head 129 and the surface of disk 102. This airflow is generated by the spinning of disk 102 and when the angular speed of disk 102 falls below the safe fly RPM, the airflow slows to a point where there may no longer be sufficient lift to keep head 129 floating. As a result, head 129 may contact the surface of disk 102 and can damage the surface of disk 102.

In the example of FIG. 4, period A is no longer than is needed to allow head 129 to move beyond the outer periphery of disk 102 before the angular velocity of disk 102 reaches a velocity at which head 129 may contact disk 102. Where controlled braking (fast spin down) could otherwise reduce the rotation of disk 102 below the safe fly RPM before head 129 can be unloaded to ramp 110, period A allows for starting the unloading to ordinarily keep head 129 from contacting the surface of disk 102 during controlled braking (fast spin down). In this regard, the duration of period A can provide just enough time for head 129 to unload before disk 102 reaches the safe fly RPM in period B.

Other embodiments may not include period A and may instead begin controlled braking without waiting for the unloading of head 129 to begin. If it is possible for head 129 to unload to ramp 110 before disk 102 reaches the safe fly RPM, the delay of period A can be omitted and unloading can begin simultaneously with the controlled braking (fast spin down) of period B.

In FIG. 4, controller 122 begins controlled braking of SM 138 in period B by causing a negative torque to be applied to rotor 106 via servo controller 136. In addition, controller 122 controls VCM 132 via VCM control signal 30 to continue to move head 129 toward ramp 110 for unloading.

At a threshold angular velocity of approximately 500 RPM, controller 122 stops controlled braking (fast spin down) and begins dynamic breaking in period C to further reduce the rotation of disks 102 and 104 without causing rotation of disks 102 and 104 in an opposite direction. As discussed above, dynamic braking can be accomplished via servo controller 136 by shorting the windings in stator 118 to develop a dynamic braking current.

The threshold angular velocity can be set to attempt to reduce spinning as much as possible during the controlled braking of period B without causing disks 102 and 104 to spin in a direction opposite to the rotational direction of disks 102 and 104 when the controlled braking (fast spin down) is first applied to rotor 106. Controller 122 may determine that the threshold angular velocity has been reached by comparing the threshold angular velocity to an angular velocity based on SM velocity signal 34. Period C ends in FIG. 4 when SM 138 stops rotating at approximately 1.0 seconds as a result of the dynamic braking.

Figure 5:
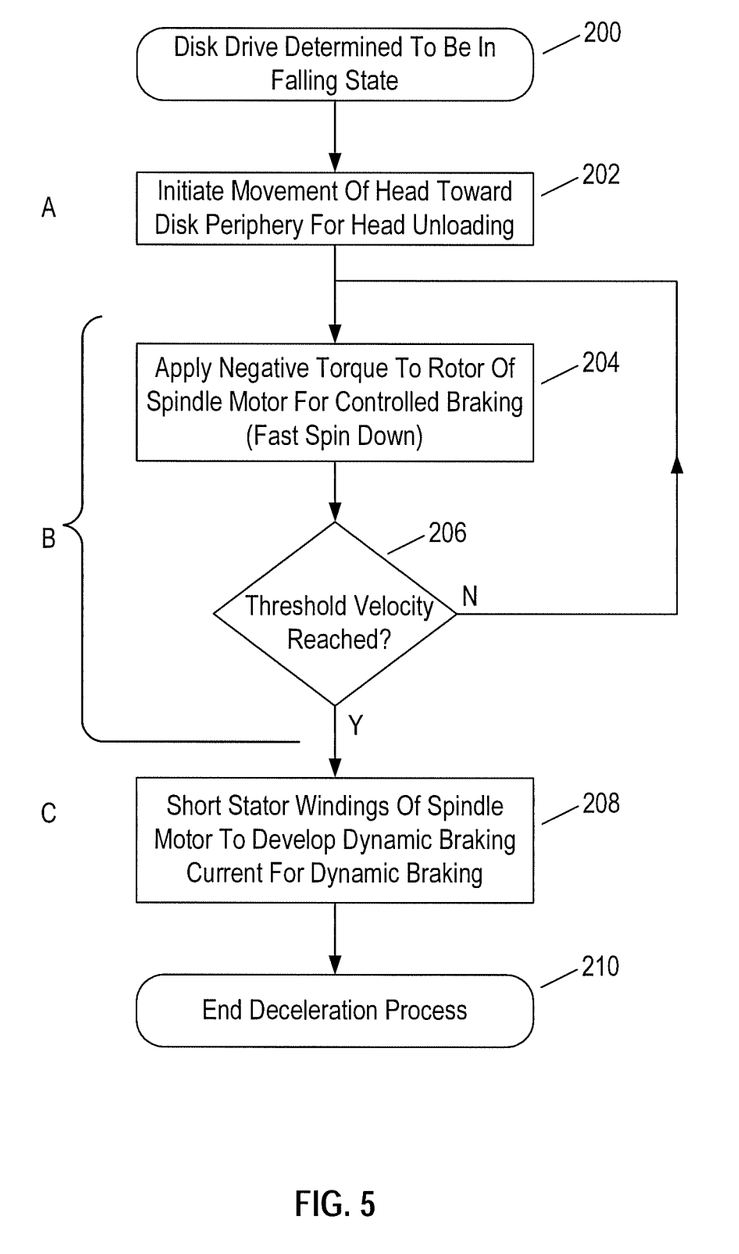
FIG. 5 is a flowchart for a spindle motor deceleration process according to an embodiment which corresponds to the deceleration illustrated in FIG. 4.

FIG. 5 is a flowchart for a spindle motor deceleration process that can be performed by controller 122 and corresponds to the deceleration shown in FIG. 4. In block 200, the deceleration process begins when controller 122 determines that disk drive 100 is in a falling state while disks 102 and 104 rotate. This determination can be made based on an input provided by sensor 134, an input received from host 101 and/or by monitoring a deceleration profile of SM 138.

In block 202, controller 122 initiates movement of head 129 (along with other heads in a head stack assembly mounted on actuator 130) toward an outer periphery of disk 102 for unloading of head 129 before reaching the safe fly RPM of disk 102. In this regard, head unloading may occur concurrently with controlled braking in block 204. Block 202 is performed during period A of FIG. 4 as indicated next to block 202 in FIG. 5.

Blocks 204 and 206 are performed during period B of FIG. 4. In block 204, controller 122 causes servo controller 136 to apply a negative torque to rotor 106 of SM 138 for controlled braking (fast spin down). Servo controller 136 may stage power so that current in windings of stator 118 generates an EMF to drive rotor 106 in reverse.

In block 206, controller 122 determines whether the angular velocity of disk 102 has reached a threshold angular velocity for stopping controlled braking and applying dynamic braking to prevent unwanted rotation of disks 102 and 104 in an opposite direction. This determination can be based on SM velocity signal 34 provided to servo controller 136 from SM 138.

In block 208, controller 122 through servo controller 136 causes an electrical short across windings of stator 118 to develop a dynamic braking current as discussed above. The braking torque associated with the dynamic braking current further reduces the angular velocity of disks 102 and 104 in period C of FIG. 4.

The deceleration process ends in block 210 where disks 102 and 104 stop spinning. As noted above, it is not necessary for disks 102 and 104 to completely stop spinning to decrease the amount of particulate matter generated during contact with disks 102 and 104. In this regard, the process of FIG. 5 may not reach the dynamic braking of block 208 before contact, but the fast spin down performed in block 204 ordinarily decreases the amount of generated particulate matter to improve the reliability of disk drive 100 after a mechanical shock event.

Figure 6:
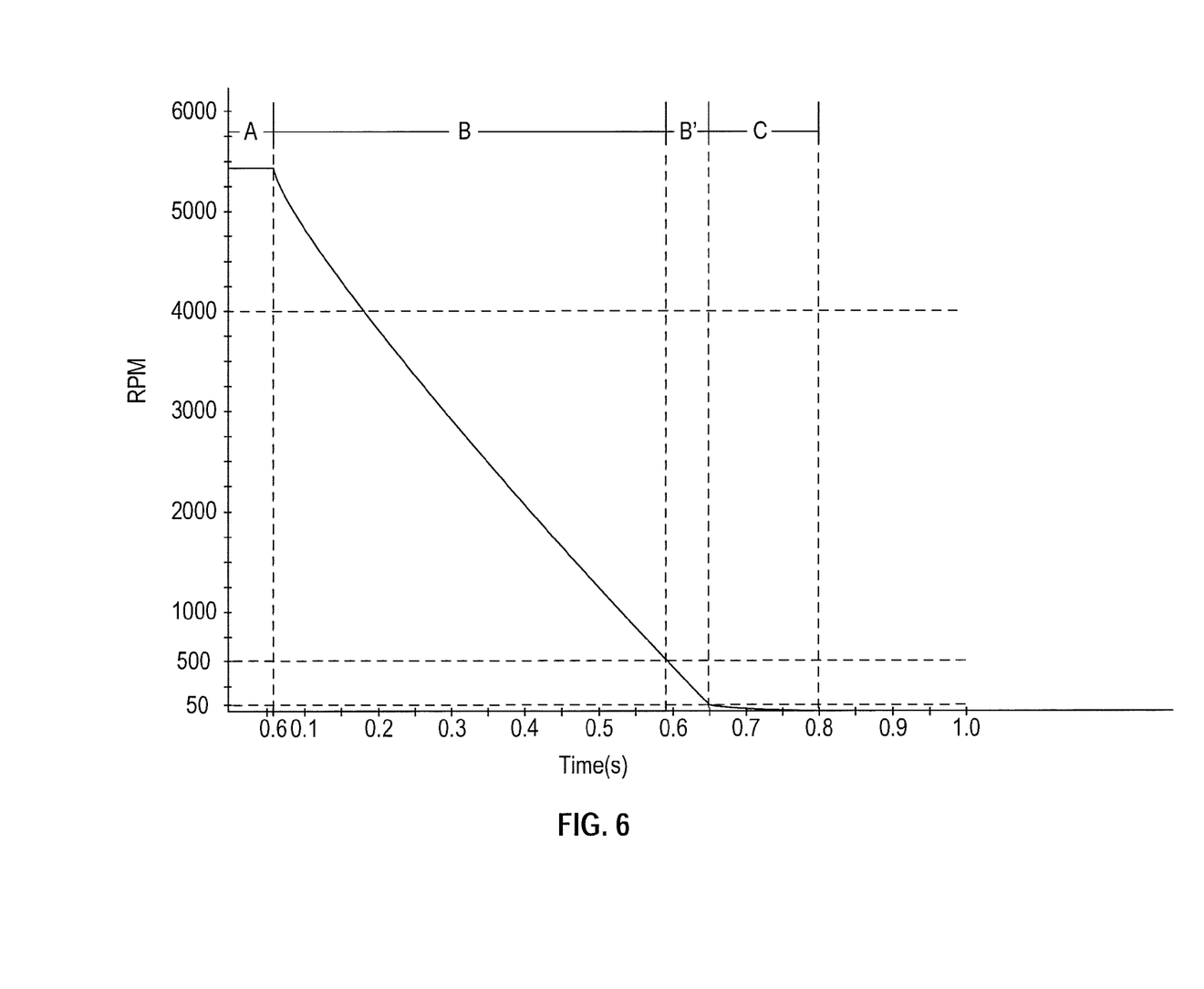
FIG. 6 is a graph depicting deceleration of a spindle motor according to another embodiment.

FIG. 6 is a graph depicting deceleration of SM 138 according to an embodiment where the controlled braking (fast spin down) of period B is extended into a period B' to reduce rotation of disks 102 and 104 quicker than in FIG. 4. The overall time to stop disks 102 and 104 from rotating is reduced from approximately 1.0 seconds in FIG. 4 to approximately 0.8 seconds in FIG. 6 due to the additional controlled braking (fast spin down) in period B'.

In FIG. 6, the delay of period A and the controlled braking (fast spin down) of period B is generally the same as that of FIG. 4, but upon reaching a velocity detection threshold of approximately 500 RPM in FIG. 6, the way of detecting the angular velocity of disks 102 and 104 changes to allow for a more accurate detection of angular velocity at lower velocities.

Specifically, detection of the angular velocity above a velocity detection threshold (approximately 500 RPM in the example of FIG. 6) may be performed based on a back EMF generated by rotor 106 and sensed across the windings of stator 118 as rotor 106 rotates. This way of detecting the angular velocity can ordinarily provide a sufficiently accurate detection of the angular velocity of disks 102 and 104 above the velocity detection threshold but may not provide an accurate measurement at lower velocities below the velocity detection threshold.

Once the angular velocity of disk 102 is detected below the velocity detection threshold, detection of the angular velocity can instead be based on sensing a mutual inductance of the windings of stator 118 which ordinarily allows for a finer or more granular detection of velocity below the velocity detection threshold. By having a more accurate detection of angular velocity at lower velocities, it is possible to extend the controlled braking (fast spin down) of period B until a lower threshold angular velocity is reached at approximately 50 RPM in FIG. 6 instead of the higher threshold angular velocity of FIG. 4 at approximately 500 RPM.

When the lower threshold angular velocity is reached, dynamic braking is applied in period C to stop rotation of disks 102 and 104 with dynamic braking. Thus, by switching to velocity detection based on mutual inductance at lower velocities, it is ordinarily possible to reduce the rotation of disks 102 and 104 quicker while still not causing rotation of disks 102 and 104 in an opposite direction.

Figure 7:
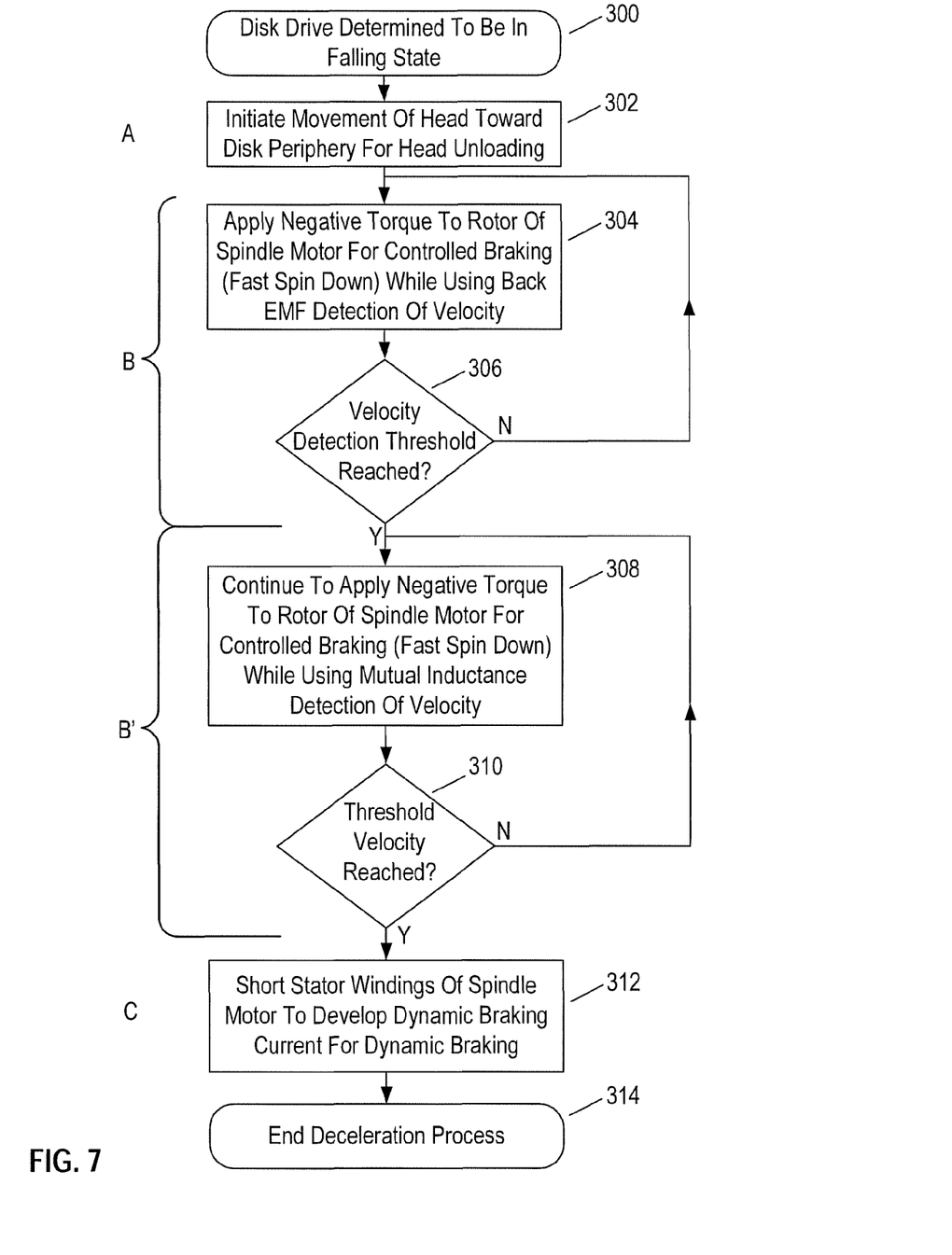
FIG. 7 is a flowchart for a spindle motor deceleration process according to an embodiment which corresponds to the deceleration illustrated in FIG. 6.

FIG. 7 is a flowchart for a spindle motor deceleration process that corresponds to the deceleration illustrated in FIG. 6 and can be performed by controller 122. Blocks 300 and 302 correspond to blocks 200 and 202 of FIG. 5 so a description of these blocks can be obtained with reference to blocks 200 and 202 described above.

Blocks 304 and 306 are performed during period B of FIG. 6. In block 304, controller 122 causes servo controller 136 to apply a negative torque to rotor 106 of SM 138 for controlled braking (fast spin down) while detecting the angular velocity of disks 102 and 104 based on a back EMF generated by rotor 106 and sensed across the windings of stator 118. Servo controller 136 may stage power so that current in windings of stator 118 generate an EMF to drive rotor 106 in reverse.

In block 306, controller 122 determines whether the angular velocity of disk 102 has reached a velocity detection threshold for switching to detecting the angular velocity of disks 102 and 104 by sensing a mutual inductance of the windings of stator 118. If the detected velocity is greater than the velocity detection threshold in block 306, the process returns to block 304.

Blocks 308 and 310 are performed during period B' in FIG. 6. If the velocity detection threshold has been reached, or in other words, if the angular velocity of disks 102 and 104 is less than or equal to the velocity detection threshold in block 306, controller 122 continues controlled braking (fast spin down) in block 308 while detecting the angular velocity of disks 102 and 104 based on sensing a mutual inductance of the windings in stator 118.

In block 310, controller 122 determines whether the threshold velocity has been reached. If not, the process returns to block 308.

If it is determined in block 310 that the threshold velocity has been reached, controller 122 through servo controller 136 causes an electrical short across the windings of stator 118 to develop a dynamic braking current for dynamic braking in block 312. By shorting the windings, the angular velocity of disks 102 and 104 is further reduced in period C of FIG. 6.

The deceleration process ends in block 314 where disks 102 and 104 stop spinning. As noted above, it is not necessary for disks 102 and 104 to completely stop spinning to decrease the amount of particulate matter generated during contact with disks 102 and/or 104.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A disk drive comprising:
   a disk for storing data;
   a head for reading data from and writing data to the disk;
   a spindle motor including a stator with windings and a rotor configured to rotate the disk; and
   a controller configured to:
      determine whether the disk drive is in a falling state while the disk rotates;
      when the disk drive is in the falling state, cause a negative torque to be applied to the rotor to reduce an angular velocity of the disk;
      determine whether the angular velocity of the disk has reached a threshold angular velocity; and
      when the angular velocity of the disk has reached the threshold angular velocity, stop causing the negative torque to be applied and cause an electrical short across the windings of the stator to further reduce the angular velocity of the disk.

2. The disk drive of claim 1, wherein the controller is further configured to initiate movement of the head toward an outer periphery of the disk.

3. The disk drive of claim 2, wherein the controller is further configured to initiate movement of the head toward the outer periphery of the disk when causing the negative torque to be applied to the rotor.

4. The disk drive of claim 2, wherein the controller is further configured to initiate movement of the head toward the outer periphery of the disk before causing the negative torque to be applied to the rotor.

5. The disk drive of claim 4, wherein the controller is further configured to delay causing the negative torque to be applied to the rotor for a period of time, the period of time being no longer than needed to allow the head to move beyond the outer periphery of the disk before the angular velocity of the disk reaches a velocity at which the head may contact the disk.

6. The disk drive of claim 1, wherein the controller is further configured to set the threshold angular velocity to reduce rotation of the disk in a direction that is opposite to a rotational direction of the disk when the negative torque is first applied to the rotor, the rotation in the opposite direction being caused by the application of the negative torque.

7. The disk drive of claim 1, further comprising a servo controller configured to stage power to the windings of the stator to generate the negative torque to be applied to the rotor in response to a control signal from the controller.

8. The disk drive of claim 1, further comprising a sensor for sensing an acceleration of the disk drive, and wherein the controller is further configured to determine whether the disk drive is in the falling state based on the acceleration of the disk drive.

9. The disk drive of claim 8, wherein the sensor includes at least one of an XYZ-YPR sensor, an XYZ sensor and a YPR sensor.

10. The disk drive of claim 1, wherein the controller is further configured to determine whether the disk drive is in the falling state by monitoring a deceleration profile of the spindle motor.

11. The disk drive of claim 1, wherein the disk drive is in communication with a host and the controller is further configured to determine whether the disk drive is in the falling state based on a falling signal received from the host.

12. The disk drive of claim 1, wherein the controller is further configured to:
   detect the angular velocity of the disk based on a back electromotive force generated by the rotor when the angular velocity of the disk is greater than a velocity detection threshold, wherein the velocity detection threshold is an angular velocity of the disk that is greater the threshold angular velocity; and
   when the angular velocity of the disk is less than the velocity detection threshold, detect the angular velocity of the disk based on sensing a mutual inductance of the windings in the stator.

13. A method for controlling a spindle motor of a disk drive including a stator with windings and a rotor configured to rotate a disk of the disk drive, the method comprising:
   determining whether the disk drive is in a falling state while the disk rotates;
   when the disk drive is in the falling state, causing a negative torque to be applied to the rotor to reduce an angular velocity of the disk;
   determining whether the angular velocity of the disk has reached a threshold angular velocity; and
   when the angular velocity of the disk has reached the threshold angular velocity, stop causing the negative torque to be applied and causing an electrical short across the windings of the stator to further reduce the angular velocity of the disk.

14. The method of claim 13, wherein the disk drive includes a head for reading data from and writing data to the disk, and wherein the method further comprises initiating movement of the head toward an outer periphery of the disk.

15. The method of claim 14, further comprising initiating movement of the head toward the outer periphery of the disk when causing the negative torque to be applied to the rotor.

16. The method of claim 14, further comprising initiating movement of the head toward the outer periphery of the disk before causing the negative torque to be applied to the rotor.

17. The method of claim 16, further comprising delaying the negative torque to be applied to the rotor for a period of time, the period of time being no longer than needed to allow the head to move beyond the outer periphery of the disk before the angular velocity of the disk reaches a velocity at which the head may contact the disk.

18. The method of claim 13, further comprising setting the threshold angular velocity to reduce rotation of the disk in a direction that is opposite to a rotational direction of the disk when the negative torque is first applied to the rotor, the rotation in the opposite direction being caused by the application of the negative torque.

19. The method of claim 13, further comprising staging power to the windings of the stator to generate the negative torque to be applied to the rotor.

20. The method of claim 13, further comprising monitoring a deceleration profile of the spindle motor to determine whether the disk drive is in the falling state.

21. The method of claim 13, further comprising:
sensing an acceleration of the disk drive; and
determining whether the disk drive is in the falling state based on the acceleration of the disk drive.

22. The method of claim 13, wherein the disk drive is in communication with a host, the method further comprising:
receiving a falling signal from the host; and
determining whether the disk drive is in the falling state based on the falling signal.

23. The method of claim 13, further comprising:
detecting the angular velocity of the disk based on a back electromotive force generated by the rotor when the angular velocity of the disk is greater than a velocity detection threshold, wherein the velocity detection threshold is an angular velocity of the disk that is greater the threshold angular velocity; and
when the angular velocity of the disk is less than the velocity detection threshold, detecting the angular velocity of the disk based on sensing a mutual inductance of the windings in the stator.

24. A computer-readable medium storing computer-executable instructions for controlling a spindle motor of a disk drive including a stator with windings and a rotor configured to rotate a disk of the disk drive, wherein when the computer-executable instructions are executed by a processor or a controller, the computer-executable instructions cause the processor or controller to:

determine whether the disk drive is in a falling state while the disk rotates;

when the disk drive is in the falling state, cause a negative torque to be applied to the rotor to reduce an angular velocity of the disk;

determine whether the angular velocity of the disk has reached a threshold angular velocity; and when the angular velocity of the disk has reached the threshold angular velocity, stop causing the negative torque to be applied and cause an electrical short across the windings of the stator to further reduce the angular velocity of the disk.

* * * * *